United States Patent [19]

Slawson

[11] 3,816,723

[45] June 11, 1974

[54] MACHINE TOOL DATA SYSTEM AND METHOD

[75] Inventor: Kenneth Leonard Slawson, Depew, N.Y.

[73] Assignee: Houdaille Industries, Inc., Buffalo, N.Y.

[22] Filed: June 7, 1971

[21] Appl. No.: 150,637

Related U.S. Application Data

[63] Continuation-in-part of Ser. No. 744,392, July 12, 1968, Pat. No. 3,634,662, which is a continuation-in-part of Ser. No. 652,968, July 12, 1967, abandoned.

[52] U.S. Cl. ............... 235/151.11, 340/172.5
[51] Int. Cl. ............... G06f 15/46, B23q 21/00
[58] Field of Search............ 235/151.11; 340/172.5; 318/568, 569, 570, 600, 601

[56] References Cited
UNITED STATES PATENTS

| | | | |
|---|---|---|---|
| 3,355,714 | 11/1967 | Culler | 340/172.5 |
| 3,465,298 | 9/1969 | La Duke et al. | 235/151.11 X |
| 3,559,179 | 1/1971 | Rhoades | 235/151.11 X |
| 3,562,715 | 2/1971 | Bishop et al. | 235/151.11 X |

FOREIGN PATENTS OR APPLICATIONS

| | | | |
|---|---|---|---|
| 1,494,849 | 8/1967 | France | 235/151.11 |

OTHER PUBLICATIONS

Bingham: The Giddings and Lewis Numericord; Proceedings of the EIA Symposium on Numerical Control Systems for Machine Tools, Sept. 1957 – Pages 49-54.

*Primary Examiner*—Felix D. Gruber
*Attorney, Agent, or Firm*—Hill, Gross, Simpson, Van Santen, Steadman, Chiara & Simpson

[57] ABSTRACT

A machine tool data system for receiving and storing abbreviated instructions representing blocks of machine tool control data and including pattern type instructions such as copy, mirror image and tool change each involving a series of such blocks, the computer responding to editing instructions such as insert or delete as to specified lines of stored instructions or computing the blocks represented by the stored instructions for transmission to an output device such as a tape punch, the computer generating the blocks of a pattern type series at the rate of utilization of said blocks by the output device. A machine tool may be connected on line and controlled by the computer simultaneously with the editing or tape preparation operations thereof, and the machine tool may be controlled manually from a data terminal on line with the computer when the terminal is not in use for tape preparation.

1 Claim, 2 Drawing Figures

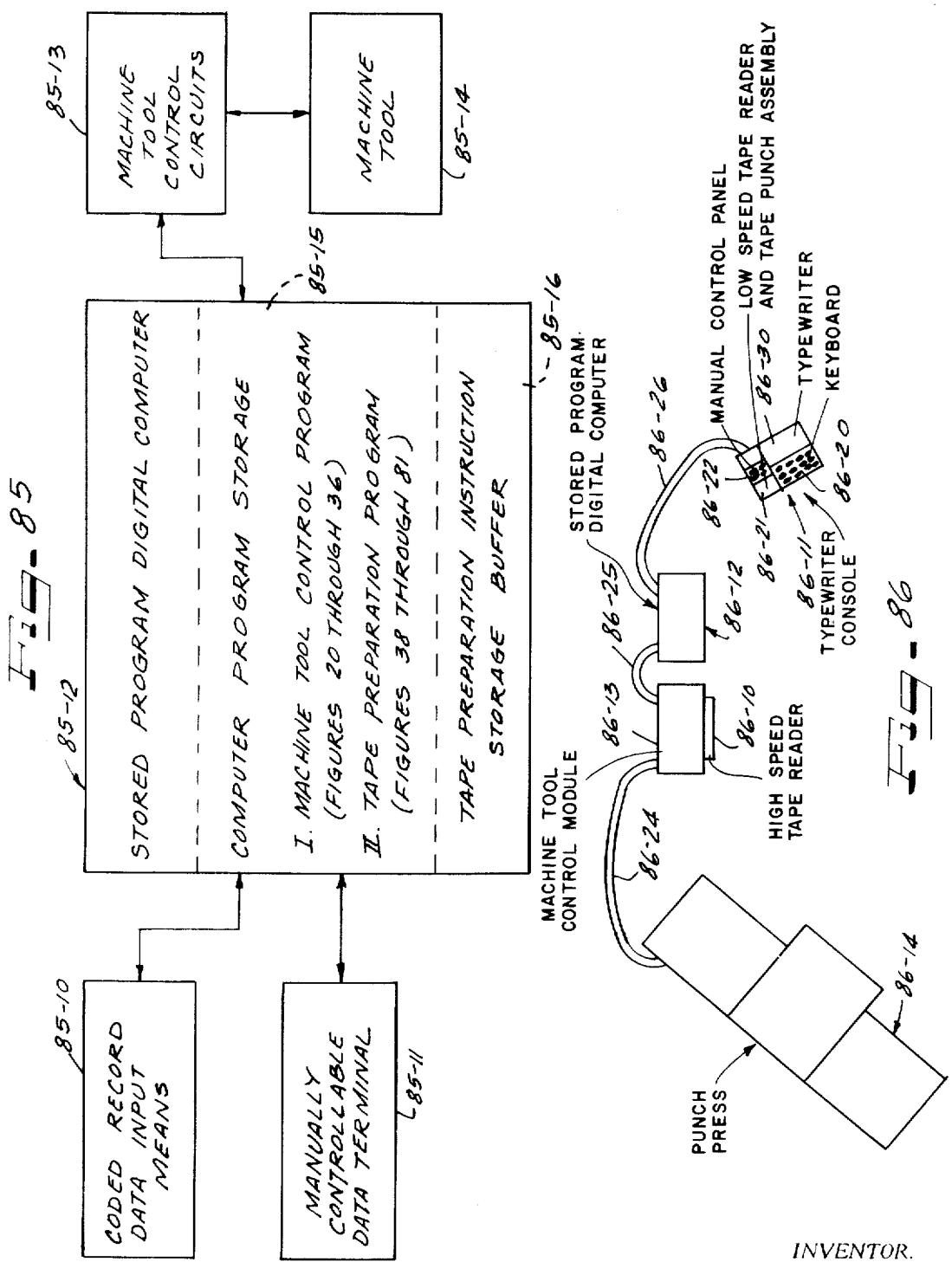

MACHINE TOOL DATA SYSTEM AND METHOD

CROSS-REFERENCES TO RELATED APPLICATIONS

The present application is a continuation-in-part of my copending application U.S. Ser. No. 744,392 filed July 12, 1968, now U.S. Pat. No. 3,634,662 issued Jan. 11, 1972, which in turn is a continuation-in-part of my prior application U.S. Ser. No. 652,968 filed July 12, 1967 (now abandoned).

Reference is also made pursuant to 35 U.S.C. 120 to my copending applications U.S. Ser. No. 122,550 filed Mar. 9, 1971, and U.S Ser. No. 831,131 filed June 6, 1969, now U.S. Pat. No. 3,629,560 issued Dec. 21, 1971, and to my prior application Ser. No. 681,776 filed Nov. 9, 1967 (abandoned in favor of the continuation application Ser. No. 122,550).

Further developments within the generic concepts of the present invention are disclosed in two applications for patent in the name of John Konvalina both entitled "Machine Tool Control System and Method," Ser. No. 148,829, filed June 1, 1971 now U.S. Pat. No. 3,725,652 issued Apr. 3, 1973, and Ser. No. 148,704, filed June 1, 1971.

Each of the above applications is hereby incorporated by reference.

SUMMARY OF THE INVENTION

A basic object of the present invention is to provide a substantially more flexible computerized machine tool control system and which is competitive in cost with existing machine tool control systems so as to justify its immediate introduction in job shops and other diversified parts production facilities, and particularly to such a system including provision for positioning a workpiece relative to a machine tool operating position in response to minicomputer-interpreted manually selected coded input signals and wherein there is a direct on line connection between the manually controllable input device and the mini-computer and between the minicomputer and the machine tool control so as to allow an accurate positioning in response to manually entered data, but with provision for minicomputer interpretation and response, so that for example the minicomputer can delay actual implementation of desired manually entered moves until such time as the status of the machine tool and the machine tool control meets pre-established conditions.

INCORPORATION BY REFERENCE

For a complete disclosure of my invention including the drawings FIGS. 1–84 and the description thereof, reference is made to U.S. Pat. No. 3,634,662. The specification of said patent (Patent application Ser. No. 744,392 filed July 12, 1968) is hereby incorporated by reference and made a part hereof.

BRIEF DESCRIPTION OF THE DRAWINGS

FIGS. 1–84 are briefly described in U.S. Pat. No. 3,634,662 referenced above, at column 2, line 1 through column 3, line 40.

FIG. 85 is an overall block diagram of a machine tool system in accordance with the present invention; and FIG. 86 shows a physical layout of the components of a commercial system in accordance with FIG. 85 located adjacent one another on a factory floor.

DESCRIPTION OF THE ACCOMPANYING DRAWINGS

Referring to FIG. 85, there is indicated diagrammatically an overall system in accordance with the present invention including a coded record data input means 85-10, a manually controllable data terminal 85-11, a stored program digital computer 85-12, a machine tool control circuits component 85-13 and a machine tool 85-14. The computer component 85-12 has been indicated as including from a functional standpoint a computer memory including a section for computer program storage indicated at 85-15 and a section 85-16 serving as a storage buffer for tape preparation instructions.

FIG. 86 illustrates a corresponding layout of physical components for a commercial system in accordance with the embodiment of FIG. 85 and including a high speed tape reader 86-10, a typewriter console 86-11, a stored program digital computer 86-12, a machine tool control module 86-13 and a punch press 86-14. The console 86-11 may include a conventional keyboard 86-20, a conventional low speed tape reader and tape punch assembly 86-21 and a manual control panel 86-22 for control of the assembly 86-21 and its communication with computer 86-12. The various components are shown as being interconnected by means of cables 86-24, 86-25 and 86-26.

The keyboard 86-20 constitutes an example of an input device operable to produce coded input signals or instructions representing blocks of machine tool control data including certain pattern type coded input signals or instructions each representing a series of blocks of machine tool control data. The tape punch of assembly 86-21 and the typewriter of console 86-11 are examples of output devices responsive to respective blocks of machine tool control data from the computer 86-12 to produce respective output operations, such as the punching of suitable machine tool control codes on a paper tape associated with the punch of assembly 86-21, or the printout of the blocks of machine tool control data by means of the typewriter. The stored program digital computer as represented at 85-12 in FIG. 85 or at 86-12 in FIG. 86 is operably connectable on line with the coded record data input means 85-10 or the high speed tape reader 86-10, for example, to receive successive blocks of machine tool control data and to compute under the control of the machine tool control program (indicated as program I in section 85-15 of component 85-12) corresponding blocks of machine tool displacement commands and to transmit the same to the machine tool control circuits 85-13 for execution by the machine tool 85-14. In a TYPE mode, machine tool control instructions may be manually transmitted from data terminal 85-11 to the computer for on line control of the machine tool 85-14 under direct supervision of an operator. The machine tool control program I under these circumstances is operable to respond to the machine tool control instructions and to generate the corresponding blocks of machine tool control data for transmission to the circuits component 85-13.

In a tape preparation mode, an operator may utilize terminal 85-11 to develop a new coded record for control of the machine tool 85-14, the operator utilizing an input device such as keyboard 86-20 connected on line with the computer 86-12 to produce coded input signals in the form of lines of successive instructions representing blocks of machine tool control data including certain pattern type coded input signals such as "copy", "mirror image" and "tool change" each involving a series of blocks of machine tool control data. The computer includes a tape preparation program identified as program II in section 85-15 of FIG. 85 for controlling the computer in the tape preparation mode. The computer also includes, for example as part of its core memory, the storage buffer 85-16 for the tape preparation instructions transmitted to the computer by the input device such as indicated at 85-11. The computer may operate on a time sharing basis in controlling the machine tool in response to a coded record at input means 85-10 and in assisting the preparation of a new coded record tape in on line association with data terminal 85-11. The computer under the control of the tape preparation program is responsive to editing instructions from data terminal 85-11 such as "insert" or "delete" as to specified lines of instructions in the storage buffer 85-16. As part of the computer operation in tape preparation mode, the computer is connectable on line with the tape punch or typewriter of console 86-11, for example, and is operable under the control of the tape preparation program to retrieve the successive instructions in the storage buffer 85-16 and to compute the corresponding blocks of machine tool control data for supply character by character to the tape punch, for example.

In retrieving a pattern type instruction from the storage buffer 85-16, the computer calculates a first block of machine tool control data and transmits the same to the tape punch, for example, acting as an output device, the computer timing the computation of the succeeding blocks of the series of blocks represented by the pattern type instruction in accordance with the rate of response of the output device such as the tape punch so that it is unnecessary for the computer internal memory to store any substantial number of the blocks of the series of blocks represented by the pattern type instruction. As an example, in section 1.10 (EXAMPLE OF PIECE PART PROGRAMMING) there is illustrated a line of instruction identified as reference block number 0011, which results in the generation by the computer of blocks of machine tool control data identified as block numbers 0011 through 0019. By storing only the instruction line, and by calculating the blocks of machine tool control data concurrently with their transmission to the output device, very substantial reductions in the capacity of computer memory are achieved.

The components of FIGS. 85 and 86 may operate in any of the manners described in the applications referred to as related applications herein, and all such features of structure and operation are disclosed with reference to the components of FIGS. 85 and 86.

FIGS. 38–81

FIGS. 38–81 are flow diagrams illustrating the tape preparation program for a commercial system in accordance with the systems of FIGS. 85 and 86, the detailed tape preparation program being set forth under the heading "Contents Of Computer Memory" beginning at column 42 of said Pat. 3,634,662.

In the following summaries references to section numbers designate sections of the "Excerpts From Operation Manual" found in the disclosure of the aforesaid U.S. Pat. No. 3,634,662.

SUMMARY OF FEATURES OF THE TAPE PREPARATION PROGRAM

In general, as will be apparent from section 1.10 the computer 85-12 operates under the control of its stored program II stored in computer memory 85-15 to respond to certain coded input signals received from an input device such as the manually operated input device 85-11. For example, where the input device includes a keyboard 86-20, the keyboard can be manually actuated to type the letter "S" standing for the "Start" command explained in section 1.8 – 1. The computer under the control of its stored program responds to the start or "initial" coded input signal so generated to print out "X Liimit =". The operator then types on the keyboard the X dimension of the workpiece, for example 18. for the workpiece, of FIG. 19 having a dimension of 18 inches parallel to the X axis. The computer under the control of the stored program upon receipt of the X axis limit causes the typewriter 86-30 to print out "Y Limit =", whereupon the operator types in the Y dimension of the workpiece, for example 12. for the workpiece of FIG. 19 having a dimension of 12 inches parallel to the Y axis. As explained under section 1.8, "4. Diagnostics", the computer program provides for an "Overflow" print out to advise the operator that the last block contained an increment which cause the cumulative coordinates with respect to an initial reference point (such as REF. PT. A of FIG. 19) to be off the workpiece as defined by the aforesaid X limit and Y Limit previously given by the operator.

Further, as explained under "2. Move Entries", a coded input signal of a pattern type may call for the generation of machine tool control data by the computer for carrying out an automatic tool change move. The computer in response to the typing of a symbol T signifying the automatic tool change, may utilize the Y limit in conjunction with an accumulated absolute displacement value representing the present work table position to compute an incremental displacement value required to shift the workpiece clear of the tool operating position. Thus, referring to section 1.10, the T coded input signal is shown as being generated in reference block number 0020. Referring to the workpiece of FIG. 19, it will be observed that the machine tool operating position is in alignment with REF. PT. B for block 19 corresponding to block number 0019. Since the accumulated Y axis displacement value is minus 6.000 for REF. PT. B in FIG. 19, and since tool change is to take place 2.5 inches off the workpiece, the computer will determine that an incremental move of 12.000 minus 6.000 plus 2.500 is required along the Y axis in order to move the workpiece to the required offset position. The block number 0020 requires an incremental X axis move of 0.000 and an incremental Y axis move of minus 8.500. The computer program will also generate suitable auxiliary function commands such as "S" meaning "Stop", "I" meaning "Inhibit Punch" and "D" meaning "Die Change". See the commands for block 0020.

Referring to FIG. 19, it will be observed that the larger diameter hole to be punched for block 21 is located at absolute displacement values relative to REF. PT. A of X equals 14. and Y equals minus 8. As seen in section 1.10 after the tool change operation of block 0020, the operator may enter the coordinates of the next position, whereupon the computer will determine the necessary incremental moves required to move the work table from the offset position indicated at 20 in FIG. 19. Thus, referring to the print out of block 0021 it will be observed that the computer has determined that incremental moves of X equals plus 5.000 and Y equals plus 6.500 will move the work table so that the workpiece of FIG. 19 has the large diameter hole of block number 21 disposed at the tool operating position. As indicated in one of the Notes of section 1.8 it is not necessary to program a P after a block that has an inhibit punch (I). Thus while the symbol I was automatically inserted by the computer for block 0020, the computer will automatically insert the punch command P for block 0021. Thus, in executing block number 0021, the computer would cause the machine tool control to move the work table 5 inches to the left and 6.5 inches in an outward direction so that location 21 of FIG. 19 would then be at the machine tool operating position, and whereupon the computer would cause a punch operation to be executed.

The response of the computer under the control of the stored program to other pattern type coded input signals is explained in sectons 1.8, 1.10 and 2.4 of the present specification. These pattern type coded input signals include the following: C directing the computer to generate a series of new blocks corresponding to a series of previous blocks (see reference block number 0003); X meaning copy a specified series of previous blocks with the sign of the X axis displacement increments reversed; Y meaning copy a specified series of previous blocks with the sign of the Y axis increments reversed; and M meaning copy a specified series of blocks with both the X and Y increments reversed in sign. The C, X, Y and M commands are represented by blocks 0003 and 0011–0019. Thus, it will be observed that these pattern type coded input signals generate moves which are repetitions of or mirror images of the moves specified by a previous series of blocks. For example referring to FIG. 19, it will be observed that the movements to holes generated by blocks number 11, 12, 17 and 18 form a mirror image in relation to the holes of block numbers 8, 9, 14 and 15.

Referring to block number 0023, it will be noted that the blocks of machine tool control data generated by the input device can be placed on punched tape in response to the command P which is explained in section 1.8, paragraph No. 9. Thus, the computer under the control of the stored program will punch a tape in EIA code in accordance with the blocks such as listed in section 1.10.

As explained in section 2.5, the tape reader 86-10 may read successive blocks of information which are presented in the EIA format. As explained in section 2.1, in step mode of operation, the computer 86-12 is operable to read one block of information at a time while inhibiting the machine function so that this mode of operation can be used by the machine tool operator to verify the positioning of machine tool 86-14 without producing a piece part. As explained in section 2.4, under "Part and Program Verification" the machine tool operator may stop the piece part production at any point and examine the schematic diagram in comparison to the value displayed in the absolute value display counters such as 450, FIG. 4. Further, the standard machine tool program will allow the machine to punch any given part at its maximum speed, while at the same time the console typewriter 86-30 attached to the computer control will be printing out as fast as it can the positioning error for X and Y for each move of the piece part. Thus, when the piece part is finished and the typewriter has stopped printing, the machine operator will have a finished part and written record of the positioning accuracy of the machine tool.

Other important features of the tape preparation program are summarized in section 2.4 of the specification.

SUMMARY OF TAPE PREPARATION OPERATION

As explained in section 1.2 with respect to the "Console Typewriter Module" the computer console 86-11 includes not only the console typewriter 86-30 but also includes a tape punch or coded record producing device (part of 86-21) and a tape reader or coded record reading device (also part of 86-21). These components are distinct from the high speed tape reader 86-10 which has an interface shown in some detail in FIG. 10. The source of instructions 85-10 may be thought of as constituting the high speed tape reader 86-10 and interface and/or the coded record device of the Console Typewriter Module 86-11, since either coded record device may be utilized for transmitting successive blocks of machine tool control data to the computer accumulator register.

To read coded records into the computer memory, certain coded input signals are generated by the console typewriter 86-30 which serves as a manually controllable input device. Where the coded record is in EIA format the characters RE are generated by component 86-11 as explained in paragraph 11 of section 1.8, while if the coded record is in ASCII format, the characters RA are generated as described in paragraph number 12. As described in paragraph 12, as the blocks are transmitted to the computer, the computer under the control of its stored program will renumber the blocks as they are stored in the computer memory 85-16, starting with one.

It will be observed from section 1.8, that numerous commands can be transmitted to the computer from the console 86-11 by means of a single character-generating manual actuation of the input keyboard 86-20, exclusive of actuations of the keyboard to identify a series of blocks, or to identify a plurality of repetitions with respect to a series of blocks, Thus the characters S,E,I,L,D, C, and so on, are all transmitted to the computer by means of a single character- generating manual actuation of the console keyboard.

As explained, for example, in section 1.8 with the exception of the coded insert signal represented by the character I, the computer under the control of the stored program will cause the console typewriter 86-30 to print out a block number before the entry of each successive data block. Thus, as indicated at the right hand column of the tabulation in section 1.10, after the Start operation, the computer will cause the console typewriter to print out 0001, signifying that the computer is now ready to receive the displacement type coded input signals such as 1.5 representing the incremental move with respect to the X axis. The console typewriter 86-30 thus includes a display device under the control of the computer for displaying the successive block numbers to which the computer will assign the next set of coded input signals from the console keyboard. As also indicated in section 1.10, the console typewriter 86-30 acting as a display device will print out the successive block numbers together with the associated machine tool function commands (such as P for punch) and incremental and absolute displacement values for the respective axes.

A more detailed summary of operation is found in section 2.

The copy command is an example of a pattern type coded input signal which may include a block identifying signal (the code characters N, M specifying block numbers N through M, inclusive) and which may include a repeat signal (the character X specifying a pattern type operation on the series of blocks X times). Other examples of pattern type coded input signals are the tool change signal (represented by the character T in data mode) and the mirror image coded input signals (X, Y and M). See also the software refinements given in the second paragraph under section 2.6.

The console typewriter module 86-11 provides both a manually operable keyboard 86-20 and a coded record device 86-21 for punching new tapes and for reading previously prepared tapes. The console typewriter is also indicated at 3703 in FIG. 37 and includes a manually operable line type character generator (for example the keyboard 86-20) for generating successive lines of coded input signals, the end of each line being signalled by actuation of the carriage return. The console typewriter module 3703 further includes a display device (provided by the print out capacity of the typewriter) which includes a display region where the successive characters generated in a single line operation of the character generator are displayed as a horizontal line on the display region.

See the example of actual block print out in section 1.10 of the disclosure of U.S. Pat. No. 3,634,662. It will be noted from reference block 0022 of section 1.10 that the typewriter 86-30 is operable to generate a displacement type coded input signal including a series of displacement values (e.g. minus 14. plus 9. minus 1.25 plus 5.) whose algebraic sum (equals minus 1.250) represents a coordinate value specifying a movement of the work table relative to one of the axes (e.g. the X axis as represented in FIG. 19). (Note the X coordinate value for the hole number 22 in FIG. 19.) It will be noted that a pattern type coded input signal (such as 4C2 at block 0003, can be generated in a single line operation of the typewriter module 3703.

SUMMARY OF MANUAL CONTROL OF MACHINE TOOL POSITIONING VIA ON LINE MINICOMPUTER

As described in U.S. Pat. No. 3,634,662 for example at column 20, lines 53–60, a stored program digital computer such as the Digital Equipment Corporation PDP-8 or PDP-8s may service a console as described in the publication "The Digital Small Computer Handbook", 1967. edition. Such small scale stored program computers are herein termed minicomputers since this term is generally employed in the art to designate such computers.

As described at column 37, lines 3–8 of U.S. Pat. No. 3,634,662 in the type mode of operation, positioning coordinates are entered to a computer control via the typewriter at the console. Upon receiving a proper command the machine tool will accurately position to a specified coordinate. This mode is extremely valuable in that it allows an accurate positioning means of manually entered data. Referring to FIG. 86, a console or manually controllable input device 86-11 is shown as including a keyboard or selectively manually actuatable means 86-20 for selective sequential manual actuation to produce coded input signals representing a desired positioning operation of the machine tool.

Referring to column 26, line 26 of Pat. No. 3,634,662 it is explained that type mode is entered by pressing the type mode switch so as to permit the use of the console typewiter for the addition of X and Y data on an existing piece part program. Referring to FIG. 26, it will be observed that the computer in processing an interrupt (such as produced by the system clock 1112, FIG. 11) will respond to the actuation of the type mode switch to shift to a manual control program routine known as TYPEXT which is represented in FIG. 36 of Pat. No. 3,634,662 and which is found in the tabulation at column 61 of Pat. No. 3,634,662 beginning with location 0336 of core memory. Thus the minicomputer represented at 85-12 in FIG. 85 may include a computer memory 85-15 containing the stored machine tool control program including an interrupt routine as shown in FIG. 26 and a manual control program routine such as shown in FIG. 36.

Referring to column 35, beginning at line 63, in the type mode, the operator first presses the TYPE MODE SWITCH and then types the letter E. As indicated in FIG. 36 by the notations CR and LF the computer manual control program routine will respond to the typing of the letter E on the keyboard such as indicated at 86-20 to produce a carriage return CR and a line feed LF of the typewriter such as indicated at 86-30 in FIG. 86. This is described at column 35, lines 65 and 66 of Pat. No. 3,634,662. As described beginning at line 67 of column 35, a plus or minus sign and five digits for the X move desired are not entered on the keyboard such as indicated at 86-20. This entry is represented by the symbols X INC in FIG. 36, and as represented in FIG. 36 once this input has been received by the computer, the computer again causes the typewriter such as 86-30 to execute a carriage return and line feed operation. Thereafter, as indicated in column 35 at lines 68 and 69, a plus or minus sign and five digits for the Y move are entered by means of the keyboard such as indicated at 86-20 of typewriter 86-30, this entry being represented by the symbols Y INC in FIG. 36. The computer manual control program routine responds to this Y move entry by causing the typewriter to again execute a carriage return and line feed.

As represented by the question RUN ON? in FIG. 36, the manual control program routine next tests the condition of the system to see if it is ready to execute the move. This step is represented in the tabulation at column 61 of Pat. No. 3,634,662 by the entries at core locations 0347 and 0350. If the run switch is not on, the program routine jumps to location 0347 designated TYPMOV, and the operation read status word (symbolized as RSW) is again performed to see if the system is ready for a move. When the run switch is found to be on, the program routine follows the instruction found at core location 0353 and causes the machine tool control to execute the move just entered from the typewriter keyboard. Referring to the instruction at core location 0353, namely JMS I MOVI, it will be noted by referring to the instruction at core location 0076 at column 50 of Pat. No. 3,634,662 that the move subroutine begins at core location 1226. Referring to column 59, it will be noted that this routine is entitled ROUTINE TO EXECUTE A MOVE. It will also be noted that this routine is represented in FIG. 23 of Pat. No. 3,634,662.

As indicated at column 5 in table VI of Pat. No. 3,634,662, the console 602 of FIG. 6 may be a Teletype model 33 ASR console such as described in the aforementioned publication "The Digital Small Computer Handbook" at pages 128–131, 207–210 and 288–291. As described in this publication, serial information written by means of a keyboard such as indicated at 86-20 is assembled by the conventional control logic for this unit for parallel transfer as indicated at 197 in FIG. 37 to the computer accumulator register (AC) as indicated at 3701 of the minicomputer such as indicated at 86-12, FIG. 86. Conversely, commands from the accumulator 3701 can be loaded in parallel into the 8-bit flip-flop shift register of the conventional control logic for typewriter 86-30 for controlling the typewriter. This is the manner in which the minicomputer acknowledges displacement commands from the typewriter by producing the carriage return and line feed operations of the typewriter. The two-way communication and direct on line connection between the console 602 and computer 603 is symbolized by the line with oppositely directed arrow heads between components 602 and 603 in FIG. 6. This same two way interconnection is also symbolized by the line with oppositely directed arrow heads between components 85-11 and 85-12 in FIG. 85.

FIG. 85 also represents the direct on line connection between minicomputer 85-12 and machine tool control 85-13 by a line with oppositely directed arrow heads in FIG. 85. The connection from the computer to the machine tool control is shown in detail in FIGS. 1A, 1B and 2 as comprising the BAC output cable 130 (also shown at the upper right in FIG. 37), and by input connections 221–337, FIG. 1A, input connections 232,241,245, FIG. 1B, and input connections 221–232, 242–245, 251–262, and 271–273, FIG. 2, leading to the respective read in gates 203–206 (included as part of the counter stages such as shown at XL11 in FIG. 1A). Connections from the machine tool control to the computer are shown in FIG. 3 and in FIG. 11 of Pat. No. 3,634,662. The example of conductor 1122, FIG. 11, leading to computer 603, is also indicated at the upper left in FIG. 37, where conductor 1122 connects with conductor AC4 of the computer accumulator 3701. In this way the minicomputer such as indicated at 603 in FIG. 11, can determine the status of the machine tool control, and accordingly carry out the instructions from the manually controllable input device such as indicated at 85-11 in FIG. 85, only when the machine tool control is in proper condition to receive a new displacement command.

The system of the invention claimed herein is directed to the combination of machine tool 85-14, machine tool control 85-13, minicomputer 85-12, particularly including the manual control program routine shown in FIG. 36 and the manually controllable input device 85-11 together with the on line connections between components 85-11 and 85-12, and between components 85-12 and 85-13, thereby to effect manual positioning operations of the machine tool in accordance with minicomputer-interpreted sequential manual actuations of the manually controllable input device. As previously explained, components 85-11 and 85-12 and the direct on line connection therebetween are known per se.

THE TAPE PREPARATION PROGRAM

The system claimed herein does not involve the tape preparation program of FIGS. 38 through 81 (program II at 85-15 in FIG. 85). This subject matter is claimed in a divisional application filed on or about Dec. 3, 1973. A listing of the contents of memory section 85-15 is found under the heading "Contents of Computer Memory" at columns 43 through 48 of U.S. Pat. No. 3,634,662.

I claim as my invention:

1. A machine tool system for positioning a workpiece relative to a machine tool operating position in response minicomputer-interpreted manually selected coded input signals, comprising in combination:
  a. a machine tool for positioning a workpiece relative to a machine tool operating position, with respect to a plurality of machine tool axes,
  b. a machine tool control coupled with said machine tool for controlling a positioning operation of the machine tool in positioning of a workpiece relative to the machine tool operating position, with respect to said machine tool axes, in response to machine tool displacement commands,
  c. a minicomputer of the stored program type including a computer memory containing a stored machine tool control program for controlling said minicomputer, said stored machine tool control program including a manual control program routine for controlling said minicomputer to interpret and respond to manually selected coded input signals and to generate machine tool displacement commands in accordance therewith,
  d. a manually controllable device including selectively manually actuable means for selective sequential manual actuation and operable in response to a selected group of sequential manual actuations to produce a corresponding coded input signal representing a desired positioning operation of said machine tool, and
  e. means providing a direct on line connection between said input device and said minicomputer, and means providing a direct on line connection between said minicomputer and said machine tool control for transmitting coded input signals from the manually controllable input device as produced in response to sequential manual actuations thereof to said minicomputer and for transmitting corresponding displacement commands as produced by said minicomputer under the control of said manual control program routine to said machine tool control, thereby to effect manual positioning operations of the machine tool in accordance with minicomputer-interpreted sequential manual actuations of the manually controllable input device.

* * * * *